I. BOTTS.
LATHE TOOL HOLDER.
APPLICATION FILED NOV. 29, 1913.
1,092,012.
Patented Mar. 31, 1914.
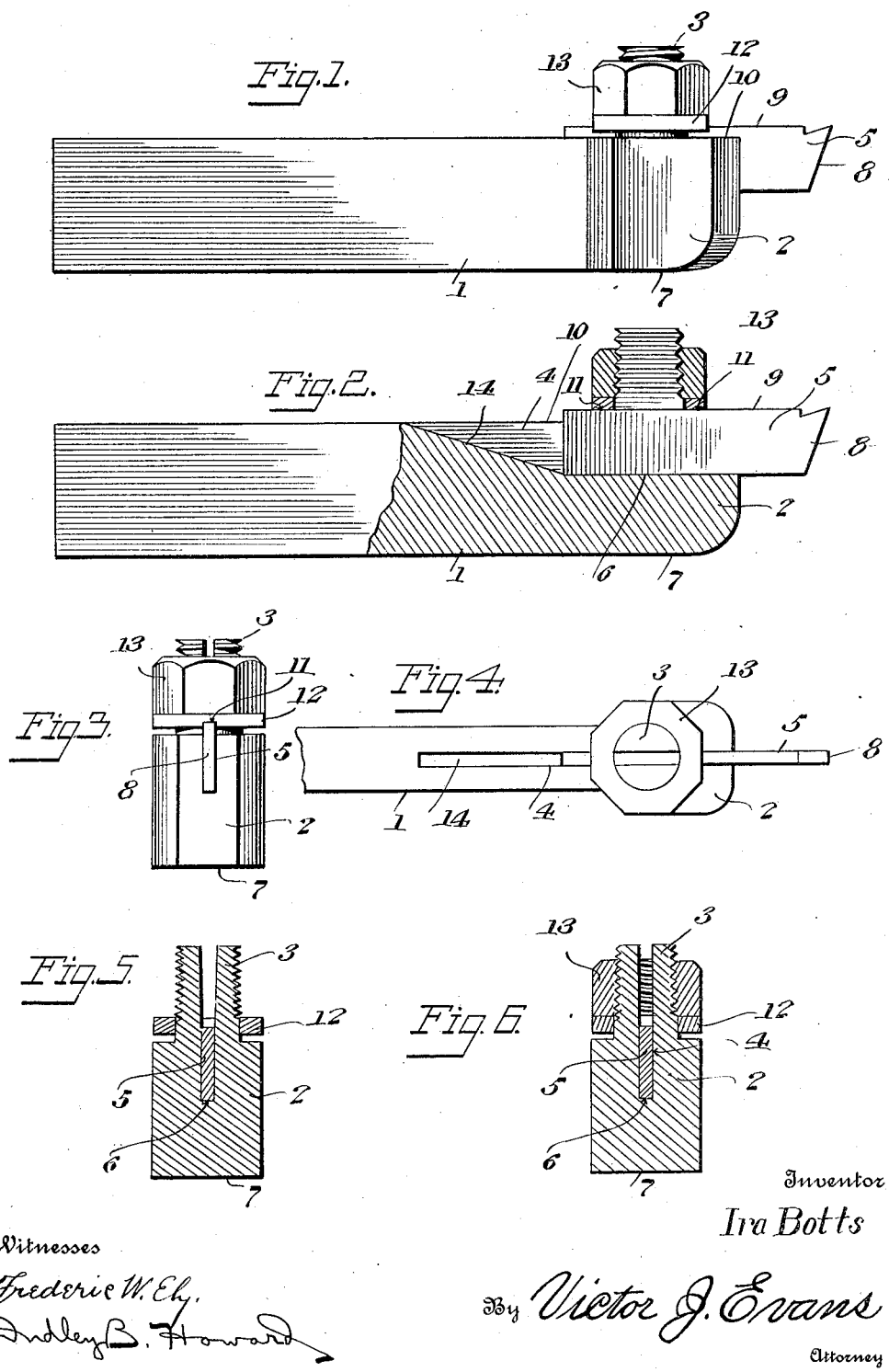
Witnesses
Frederic W. Ely.
Dudley B. Howard.
Inventor
Ira Botts
By Victor J. Evans
Attorney
COLUMBIA PLANOGRAPH CO., WASHINGTON, D. C.

UNITED STATES PATENT OFFICE.

IRA BOTTS, OF LOS ANGELES, CALIFORNIA.

LATHE-TOOL HOLDER.

1,092,012.

Specification of Letters Patent. Patented Mar. 31, 1914.

Application filed November 29, 1913. Serial No. 803,738.

*To all whom it may concern:*

Be it known that I, IRA BOTTS, a citizen of the United States, residing at Los Angeles, in the county of Los Angeles and State of California, have invented new and useful Improvements in Lathe-Tool Holders, of which the following is a specification.

This invention relates to a tool holder for lathes or planers, the chief object being to provide a holder wherein the cutting tool may be mounted in a very secure manner so that it will withstand the severe conditions of usage upon a high speed lathe and especially in cutting hard steel.

A further object is to provide a device of this character which is extremely simple in construction and composed of very few parts so as to be rendered durable, easy to operate, and inexpensive in the cost of manufacture.

The invention consists in the features of construction, combination, and arrangement of parts, hereinafter fully described and claimed, reference being had to the accompanying drawings, in which:

Figure 1 is a side elevation of a tool holder constructed in accordance with the invention for use in connection with a parting tool, this form of cutting tool being shown applied thereto; Fig. 2 is a longitudinal sectional view through the holder, the parting tool being in side elevation; Fig. 3 is a front elevation of the device; Fig. 4 is a fragmentary top plan view; Fig. 5 is a transverse sectional view showing the clamping nut detached; and Fig. 6 is a similar view showing the clamping nut in applied position.

In the drawing, the tool holder is constructed particularly for use in mounting a parting, or cut-off tool, but it is to be understood that this is only one form of the device and that the holder may be constructed for use in connection with any desired cutting tool.

The numeral 1 designates the elongated rectangular shank of the holder, which is thickened transversely at one end to provide a head 2 which is very strong and durable. An upwardly projecting boss 3 is formed upon this head 2, it being circular in transverse section and tapered slightly toward its upper free end and provided with external screw threads. The holder is provided at this end with a longitudinal slot 4 which extends medially through the boss 3 and the upper portion of the head 2 so as to open through the upper and end faces of the head and divide the boss into laterally spaced sections. This slot is constructed initially equal in width throughout to the width of the particular cutting tool to be mounted in the slot, the slot being very narrow in this instance owing to the narrowness of the parting tool. The side portions of the head, which define the side walls of the slot, are, however, sprung laterally prior to the tempering of the holder, which latter is constructed preferably of a fine grade of steel. Owing to this feature of the construction, a cutting tool, such as that indicated by the numeral 5, may be mounted within the slot 4, so as to be seated upon the base wall 6 of the slot, the active portion of which is disposed parallel to the under face 7 of the holder, with its cutting end 8 projecting outwardly in prolongation of the holder. When the cutting tool is mounted between the slightly yieldable jaws thus formed by the side portions of the head, its upper edge 9 is adapted to protrude above the upper face 10 of the holder head for reception within the diametrically opposite, rectangular notches 11 which are provided in the under face of an annular locking washer 12 that is slipped over the split boss after the cutter has been applied. This washer is constructed so as to fit loosely upon the boss. A clamping nut 13, whose bore is threaded and tapered longitudinally, is adapted to be threaded onto the boss so as to compress the longitudinally split side portions of the same and thus force the jaws of the holder inwardly into firm engagement with the cutting tool. This nut is adapted to be moved inwardly into engagement with the washer 12 during the tightening operation so as to bind the tool down against its seat in a secure manner.

When it is desired to release the tool for any purpose, such as to project the same farther from the holder, in order to make a deeper cut or in order that the same may be sharpened conveniently, the nut is screwed off the boss, it being understood that a wrench or any other desired form of operating tool (not shown) may be used for this purpose. This will permit the jaws of the holder to expand, whereupon the cutting tool will be released.

The inner or base wall of the slot 4 is inclined upwardly and inwardly from its horizontal portion 6, as at 14 so as to provide a guide surface which is adapted to serve as effective means for directing the point of any narrow blade or other instrument, which may be inserted within the slot, into engagement with the inner end of the cutting tool, when the latter has become stuck in the slot due to heat expansion or corrosion of the metal.

In the present instance, the slot for the reception of the cutting tool is constructed equal in width throughout when the body of the holder is first made as has been stated hereinbefore, but it is to be understood that in the manufacture of the holder for other cutting tools which are broader than a parting tool, that portion of the slot which extends through the head of the holder and the lower portion of the threaded boss alone is constructed wide enough to accommodate the tool, that portion of the slot which extends through the upper portion of the boss being narrow so as not to reduce the strength of the boss materially. Such details of the construction, which are merely changes in dimension, falling within the scope of the invention may be resorted to in practice.

What I claim is:

1. A tool holder of the class described comprising an elongated body constructed of resilient material, an externally threaded tapered boss formed upon the said body so as to project outwardly therefrom, the said body being provided with a longitudinal tool-receiving slot extending longitudinally through the said boss to divide the same into relatively yieldable sections, and a clamping nut having a tapered threaded bore adapted for engagement with the said boss.

2. A tool holder of the class described comprising an elongated body constructed of resilient material, an externally threaded tapered boss formed upon the said body so as to project outwardly therefrom, the said body being provided with a longitudinal tool-receiving slot extending longitudinally through the said boss to divide the same into relatively yieldable sections, an annular washer adapted to be positioned upon the said boss so as to surround the same and to engage the outer edge of a tool positioned within the said slot, the said washer being provided in its inner face with diametrically opposite notches for the reception of the adjacent edge of the tool, and a clamping nut having a tapered threaded bore adapted for engagement with the said boss.

3. In a device of the class described, an elongated holder body having a longitudinal tool-receiving slot therein opening through one of its end faces and adjacent longitudinal face, the base wall of the said slot being constructed to form an outer portion parallel to the longitudinal axis of the body and an inner portion which is inclined outwardly toward the longitudinal face of the body through which the slot opens, and means for clamping a tool in the said slot for engagement with the outer portion of the said base wall.

In testimony whereof I affix my signature in presence of two witnesses.

IRA BOTTS.

Witnesses:
R. W. LE MELLE,
JAMES HAWLEY.